United States Patent Office 3,576,816
Patented Apr. 27, 1971

3,576,816
PROCESS FOR MAKING 3-(2-BENZOTHIAZOLYL)-2-BENZOTHIAZOLINEONE
Sidney T. Webster, Nitro, and John J. D'Amico, Dunbar, W. Va., assignors to Monsanto Company, St. Louis, Mo.
No Drawing. Original application Oct. 16, 1964, Ser. No. 404,516, now Patent No. 3,400,133, dated Sept. 3, 1968. Divided and this application Jan. 10, 1968, Ser. No. 738,715
Int. Cl. C07d 91/44
U.S. Cl. 260—304         2 Claims

ABSTRACT OF THE DISCLOSURE

Preparation of 3 - (2 - benzothiazolyl)-2-benzothiazolineone by reacting 2-chlorobenzothiazole with an alkali metal salt of 2-hydroxybenzothiazole.

---

This is a division of application Ser. No. 404,516, filed Oct. 16, 1964, now U.S. Pat. 3,400,133.

The invention relates to an improved method for preparing N-substituted heterocyclic systems from corresponding thioethers by rearrangement of the symmetrical thioethers. The invention also relates to 3-(2-benzothiazolyl)-2-benzothiazolineone. More particularly, it deals with the preparation of thiones having the Formula 1

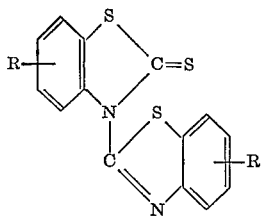

from the corresponding thioethers having the Formula 2

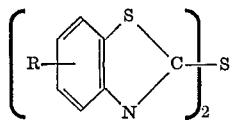

where R is hydrogen, Cl, $NO_2$, phenyl, lower alkoxy or lower alkyl where the alkyl is for example methyl, ethyl, propyl, isopropyl or amyl. It also deals with the preparation of 3-(2-benzothiazolyl)-2-benzothiazolineone of the formula

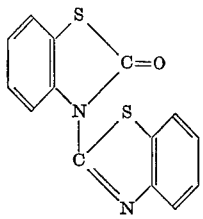

An object of the invention is to provide an improved method for the rearrangeemnt of thioethers of Formula 2, supra, to the corresponding N-substituted thione compounds. Among the specific objects of the invention is a method for the preparation of a thione of the Formula 1, supra, where R is hydrogen, halogen, alkyl, alkoxy, phenyl or $NO_2$ and a method for the preparation of 3-(2-benzothiazolyl)-2-benzothiazolineone.

A further object of the invention is a method for the preparation of certain N-substituted thione compounds in high yields.

A further object of the invention is a method for the preparation of 3-(2-benzothiazolyl)-2-benzothiazolineone in a high yield.

There are several examples of thioethers rearranging. These rearrangements are attributed to either thermal or catalytic effect. For example, 2-benzyl thiobenzothiazole was obtained when benzyl chloride was reacted with 2-mercaptobenzothiazole. However, heating the same reactants at temperatures above 200° C. in the absence of alkali produced the N-substituted derivative. Elderfield in 5 Elderfield, Heterocyclic Compounds 566, (1957) suggested that the N-substituted benzyl derivative obtained under these conditions was a result of thermal rearrangement. It has also been reported that rearrangement of 2-alkylmercaptobenzothiazole to the N-substituted thione compound was accomplished by catalysis with halogens at high temperatures.

It was reported by Teppema, U.S. Pat. 2,028,082, that 2,2'-thiobis(benzothiazole) could be converted into a higher melting isomer by heating to 150° C. or above. Investigation of this thermal rearrangement revealed that a mere 0.7% yield of rearranged product resulted. But we discovered that when a thioether was heated with a mercaptan or an alkali metal salt of a mercaptan, rearrangement of the thioether molecule to the corresponding thione was accomplished with relative ease. The sodium salt of the mercaptans was the preferred salt, however other salts may be used for example the potassium, ammonium, zinc, magnesium or lead salts. Also when a thione, for example 3-(2-benzothiazolyl)-2-benzothiazolinethione, was treated with a mercaptan or a salt of a mercaptan at a high temperature a low percentage of the compound was rearranged to the corresponding thioether. Therefore, the rearrangement of a thioether to its corresponding thione was demonstrated to be reversible and an equilibrium reaction.

We further discovered that when a thioether was heated with trifluoroacetic acid, concentrated sulfuric acid or toluenesufonic acid, a rearrangement to the corresponding thione was accomplished and 3(2-benzothiazolyl)-2-benzothiazolineone was also a product. To illustrate this part of my invention, a stirred mixture containing 30 grams (0.1 mole) of 2,2'-thiobis-(benzothiazole) and 1.14 grams (0.01 mole) of trifluoroacetic acid was heated at 225° to 230° C. for 5 hours. The hot reaction mixture was poured into a dish and allowed to stand overnight. The product, melting point 115°–123° C., obtained in quantitative yield, consisted of 69.8 weight percent 3-(2-benzothiazolyl)2-benzothiazolinethione, 9.1 weight percent of product identified as 3-(2-benzothiazolyl)-2-benzothiazolineone and 21.1 weight percent 2,2'-thiobis(benzothiazole) according to vapor phase chromatographic analysis. A sample of 3-(2-benzothiazolyl)-2-benzothiazolinethione isolated by recrystallization from ethyl acetate melted at 138°–143° C. It melted at 147°–148° C. after a second recrystallization of a 6 gram sample from 300 ml. of ethyl alcohol and 50 ml. of ethyl acetate. A mixture melting point with an authentic sample did not depress the melting point and the infrared spectra of the two were superimposable. Analysis gave 9.0% nitrogen and 32.12% sulfur as compared to 9.33% nitrogen and 32.03% sulfur calculated for $C_{14}H_8N_2S_3$.

To illustrate the rearrangement whereby a higher proportion of 3 - (2 - benzothiazolyl)-2-benzothiazolineone forms, the trifluoroacetic acid of the reaction described, supra, was replaced with 1.027 grams (0.01 mole) 95.5% sulfuric acid. The product obtained in a quantitative yield contained 44.5 weight percent 3-(2-benzothiazoyly)-2-benzothiazolinethione, 32.6 weight percent 3-(2-benzothiazolyl)-2-benzothiazolineone and 22.9 weight percent 2,2' - thiobis(benzothiazole) according to vapor phase chromatographic analysis.

Replacement of the trifluoroacetic acid of the reaction described, supra, with 1.9 grams (0.01 mole) of para-toluenesulfonic acid gave a quantitative yield of a product containing 44.1 weight percent 3-(2-benzothiazolyl)-2-benzothiazolinethione, 39.7 weight percent 3-(2-benzothiazolyl)-2-benzothiazolineone and 16.2 weight percent 2,2′-thiobis(benzothiazole) according to vapor phase chromatographic analysis.

An attempt to rearrange 2,2′-thiobis(benzoxazole) to its corresponding thione demonstrated the uniqueness contributed by the sulfur in the ring of 2,2′-thiobis(benzothiazole). To illustrate this attempt, 17.5 grams (0.0651 mole) 2,2′-thiobis(benzoxazole) and 0.98 grams (0.00651 mole) 2-mercaptobenzoxazole were heated at 225° C. for 5 hours. The mixture was cooled. Vapor phase chromatographic analysis of this mixture showed that the mixture was unreacted starting material. Thus, rearrangement of 2,2′-thiobis(benzoxazole) to its corresponding N-substituted thione isomer was not accomplished.

Lastly, we have discovered a method for the preparation of the heretofore unknown 3-(2-benzothiazolyl)-2-benzothiazolineone as the sole product in high yields. To prepare this compound, to a stirred solution containing 69.3 grams (0.4 mole) of anhydrous sodium 2-hydroxybenzothiazole in 300 ml. of dimethylformamide, 65 grams (0.39 mole) of 2-chlorobenzothiazole was added in one portion. The stirred solution was heated at 150° to 160° C. for a period of 5 hours. After cooling to 40° C., the resulting precipitate was added to 1000 grams of ice water containing 64 grams (0.4 mole) of 25% aqueous sodium hydroxide. After stirring at 25° to 30° C. for 1 hour, the precipitate was collected by filtration, washed with water until the washings were neutral to litmus and air dried at 45° C. The product, melting point 149°–152° C., was obtained in 86.5% yield. After recrystallization of a sample from ethyl acetate, the 3-(2-benzothiazolyl)-2-benzothiazolineone melted at 159°–160° C. Vapor phase chromatographic analysis of the recrystallized sample gave only one peak. Analysis gave 9.71% nitrogen and 22.71% sulfur as compared to 9.85% nitrogen and 22.55% sulfur calculated for $C_{14}H_8N_2OS_2$. A molecular weight of 290 was found. The calculated molecular weight for $C_{14}N_8N_2OS_2$ was 284.4. The infrared spectrum was in agreement with the structure of 3-(2-benzothiazolyl)-2-benzothiazolineone. The same reaction was carried out in a medium of dimethylsulfoxide and comparable results were obtained.

3-(2-benzothiazolyl)-2-benzothiazolineone is a fungicide valuable for preventing attack by *Phytophthora infestans*, the cause of late blight on tomato plants. The method for testing this chemical was carried out in the following manner. 3 - (2 - benzothiazolyl) - 2 - benzothiazolineone was applied in a 0.1% concentration spray to the foliage of 4-week old tomato plants. Twenty-four hours later inoculum in the form of zoospores of *Phytophthora infestans* was sprayed on the tomato plants. The plants were inoculated for 24–48 hours in a constant temperature-humidity chamber, and transferred to a greenhouse where readings were made at appropriate times. 3 - ( 2 - benzothiazolyl) - 2 - benzothiazolineone received a rating of 1 for the severity of the disease on this test. A rating of 1 for the severity of the disease means that the disease was completely controlled.

It is intended to cover all modifications of examples chosen for purposes of disclosure which do not constitute departure from the spirit and scope of the invention.

We claim:
1. The method of synthesizing 3-(2-benzothiazolyl)-2-benzothiazolineone which comprises reacting an alkali metal salt of 2-hydroxybenzothiazole and 2-chlorobenzothiazole.
2. The process of claim 1 wherein the reaction is carried out in a medium selected from the group consisting of dimethylformamide and dimethylsulfoxide.

References Cited

Elderfield, Heterocyclic Compounds, vol. 5, (John Wiley & Sons, Inc., New York, 1957), pp. 542–544 and 551–553.

Parker, Quarterly Reviews, vol. 16, pp. 178–181 (1962).

ALTON D. ROLLINS, Primary Examiner